(12) United States Patent
Kim

(10) Patent No.: US 9,772,727 B2
(45) Date of Patent: Sep. 26, 2017

(54) TOUCH PANEL

(71) Applicant: LG INNOTEK CO., LTD., Seoul (KR)

(72) Inventor: Byeong Seob Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 190 days.

(21) Appl. No.: 14/539,120

(22) Filed: Nov. 12, 2014

(65) Prior Publication Data

US 2015/0130760 A1     May 14, 2015

(30) Foreign Application Priority Data

Nov. 13, 2013 (KR) .................. 10-2013-0137556

(51) Int. Cl.
    *G06F 3/044*     (2006.01)

(52) U.S. Cl.
    CPC .... *G06F 3/044* (2013.01); *G06F 2203/04103* (2013.01); *G06F 2203/04111* (2013.01)

(58) Field of Classification Search
    CPC ...................................................... G06F 3/044
    See application file for complete search history.

(56) References Cited

U.S. PATENT DOCUMENTS

| | | | | |
|---|---|---|---|---|
| 6,488,981 B1 * | 12/2002 | Richter | .................. | G06F 3/041 |
| | | | | 204/192.1 |
| 8,872,786 B2 * | 10/2014 | Matsuo | .................. | G06F 3/044 |
| | | | | 345/174 |
| 2007/0093035 A1 * | 4/2007 | Daigle | .................. | H05K 3/38 |
| | | | | 438/455 |
| 2007/0242054 A1 * | 10/2007 | Chang | .................. | G06F 3/044 |
| | | | | 345/173 |
| 2008/0309635 A1 * | 12/2008 | Matsuo | .................. | G06F 3/044 |
| | | | | 345/173 |
| 2011/0291987 A1 * | 12/2011 | Wang | .................. | G06F 3/044 |
| | | | | 345/174 |
| 2011/0316803 A1 * | 12/2011 | Kim | .................. | G06F 3/044 |
| | | | | 345/173 |
| 2012/0113043 A1 * | 5/2012 | Liu | .................. | G06F 3/044 |
| | | | | 345/174 |
| 2013/0082961 A1 * | 4/2013 | Wang | .................. | G06F 3/044 |
| | | | | 345/173 |

(Continued)

FOREIGN PATENT DOCUMENTS

| | | | | |
|---|---|---|---|---|
| CN | WO 2013023482 A1 * | 2/2013 | ............. | G06F 3/044 |
| KR | 10-2012-0038096 A | 4/2012 | | |
| KR | 10-2013-0049987 A | 5/2013 | | |

OTHER PUBLICATIONS

Dawkins, Trig Cheat Sheet, 2005, pp. 1-4 downloaded Jul. 16, 2016 from http://tutorial.math.lamar.edu/Trig_Cheat_Sheet. pdf.*

(Continued)

*Primary Examiner* — Dorothy Harris (74) *Attorney, Agent, or Firm* — KED & Associates, LLP (57) ABSTRACT

A touch panel includes a cover substrate having an active area and an unactive area. A printing layer is provided on the unactive area while forming a step difference from the cover substrate. An insulating layer is provided on the printing layer, and the insulating layer has average surface roughness in a range of 0.2 μm to 0.4 μm.

18 Claims, 12 Drawing Sheets

(56) References Cited

U.S. PATENT DOCUMENTS

| | | | | |
|---|---|---|---|---|
| 2013/0241857 A1* | 9/2013 | Chung | ............... | G06F 3/041 345/173 |
| 2014/0079917 A1* | 3/2014 | Huang | ............ | B32B 38/145 428/189 |
| 2015/0041303 A1* | 2/2015 | Cao | ............ | G06F 3/044 200/600 |
| 2015/0084917 A1* | 3/2015 | Kim | ............ | G06F 3/044 345/174 |
| 2015/0085204 A1* | 3/2015 | Lee | ............ | G06F 3/041 349/12 |
| 2015/0114816 A1* | 4/2015 | Kim | ............ | G06F 3/044 200/600 |
| 2015/0169109 A1* | 6/2015 | Park | ............ | G06F 3/044 345/174 |
| 2015/0177882 A1* | 6/2015 | Kim | ............ | G06F 3/044 345/174 |
| 2015/0223324 A1* | 8/2015 | Kim | ............ | H05K 1/0259 345/174 |
| 2015/0301685 A1* | 10/2015 | Kim | ............ | G06F 3/041 345/173 |
| 2015/0373839 A1* | 12/2015 | Kim | ............ | H05K 1/0274 345/174 |
| 2016/0034066 A1* | 2/2016 | Nah | ............ | G06F 3/044 345/174 |

OTHER PUBLICATIONS

Surface conversion chart tables from Engineers Edge, 4 pages downloaded Jul. 16, 2016 from http://www.engineersedge.com/manufacturing/surface-roughness-conversion.htm.*

Wikipedia Surface roughness article, 5 pages downloaded Jul. 16, 2016 from https://en.wikipedia.org/wiki/Surface_roughness.*

* cited by examiner

TOUCH PANEL

CROSS-REFERENCE TO RELATED APPLICATION

This application claims priority under 35 U.S.C. §119 to Korean Application No. 10-2013-0137556 filed on Nov. 13, 2013, whose entire disclosure is incorporated herein by reference.

BACKGROUND

1. Field

The embodiment relates to a touch panel.

2. Background

An input function through a touch of an image displayed on a touch panel by an input device such as a stylus pen or a finger has been applied to various electronic appliances. Various types of touch panels may be provided depending on positions of transparent electrodes formed in the touch panels. For example, the transparent electrode may be directly formed on a cover substrate.

A printing layer is formed in a Bezel area where a touch is not sensed, and a wire electrode is formed on the printing layer. The wire electrode may be connected with a sensing electrode to sense the touch through a pad part. As at least two printing layers are formed, a step difference may be formed between the printing layers or between the printing layer and a cover window. The wire electrode may be formed on the printing layers having the step difference. Accordingly, the wire electrode may be cracked or the reliability of the wire electrode may be degraded due to the step difference. In addition, if the wire electrode is directly formed on the printing layer, the wire electrode may be damaged due to the high surface roughness of the printing layer when the wire electrode is formed.

BRIEF DESCRIPTION OF THE DRAWINGS

The embodiments will be described in detail with reference to the following drawings in which like reference numerals refer to like elements wherein.

DETAILED DESCRIPTION

Referring to FIGS. 1 to 6, a touch panel according to the first embodiment may include a cover substrate 100, a printing layer 200, a sensing electrode 300, a wire electrode 400, and an insulating layer 500. The cover substrate 100 may be rigid or flexible. For example, the cover substrate 100 may include glass or plastic. The cover substrate 100 may include chemically tempered glass, such as soda lime glass or aluminosilicate glass, plastic, such as polyethylene terephthalate (PET) or polyimide (PI), or sapphire.

A sapphire substrate has superior electric characteristics, such as permittivity, so that a touch response speed may be increased and a space touch such as hovering may be easily implemented. Because the sapphire has a high surface hardness, the sapphire substrate is applicable to a cover substrate. The hovering signifies a technique for recognizing coordinates even in a position spaced apart from a display by a short distance.

A portion of the cover substrate 100 may be curved with a curved surface. In other words, a portion of the cover substrate 100 may have a flat surface, and another portion of the cover substrate 100 may be curved to form a curved surface. For example, an end portion of the cover substrate 100 may be curved with a curved surface or may be curved or bent with a surface having a random curvature.

The cover substrate 100 may have an active region AA and an unactive region UA defined therein. An image may be displayed in the active region AA. The image is not displayed in the unactive region UA provided at a peripheral portion of the active region AA.

In addition, the position of an input device (e.g., stylus) or finger may be sensed in at least one of the active region AA and the unactive region UA. If the input device touches the touch window, the variation of capacitance occurs in the touched part by the input device, and the touched part subject to the variation of the capacitance may be detected as a touch point. The sensing electrode 300 may be provided on at least one of the active region AA and the unactive area UA of the cover substrate 100. For example, the sensing electrode 300 may be provided on the active area of the cover substrate 100. The sensing electrode 300 includes sub-electrodes crossing each other, and may be formed in the shape of a mesh by the sub-electrodes.

The sensing electrode 300 may be a conductive material. The sensing electrode 300 may include a transparent conductive material allowing electricity to flow without the interruption of light transmission. For example, the sensing electrode 300 may include a metallic oxide, such as indium tin oxide, indium zinc oxide, copper oxide, tin oxide, zinc oxide, or titanium oxide. In a non-limiting embodiment, the sensing electrode 300 may include nanowire, photosensitive nanowire film, carbon nanotube (CNT), graphene, or conductive polymer. The sensing electrode 300 may comprise of various metals. For example, the sensing electrode 300 may include at least one of chromium (Cr), nickel (Ni), copper (Cu), aluminum (Al), silver (Ag), molybdenum (Mo), and the alloy thereof.

The sensing electrode 300 may include a first sensing electrode 310 and a second sensing electrode 320.

The first sensing electrode 310 may be provided on the active area AA of the cover substrate 100 while extending in a first direction. The first sensing electrode 310 may directly make contact with the cover substrate 100. The second sensing electrode 320 may be provided on the active area AA of the cover substrate 100 while extending in a second direction. The second sensing electrode 320 may extend in the second direction different from the first direction and may directly make contact with the cover substrate 100. The first and second sensing electrodes 310 and 320 may directly make contact with the same surface of the cover substrate 100 and extend in mutually different directions on the same surface of the cover substrate 100.

The first and second sensing electrodes 310 and 320 may be insulated from each other on the cover substrate 100.

Figure 1:
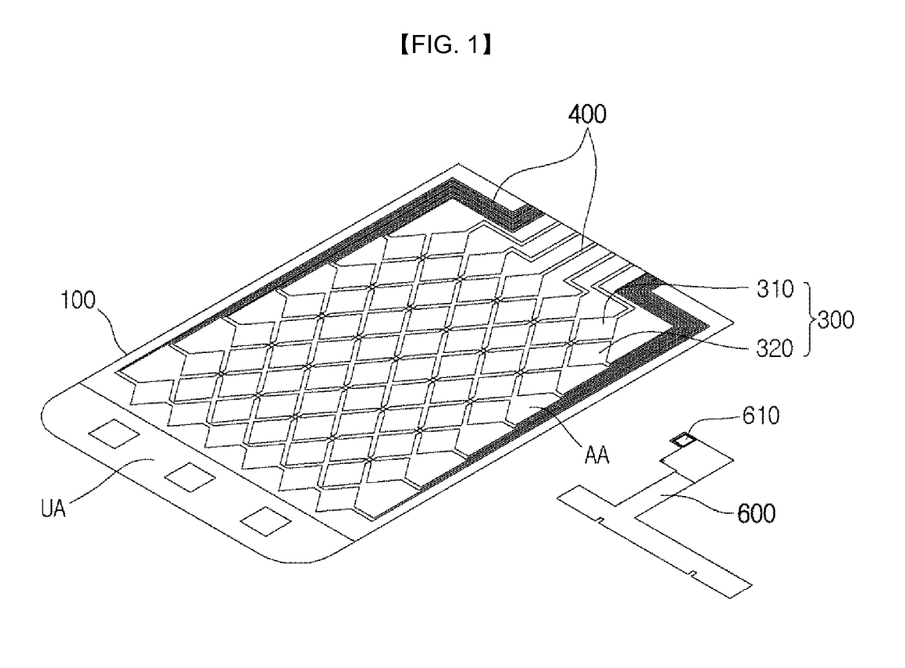
FIG. 1 is a perspective view showing a touch panel according to the first embodiment.
Figure 2:
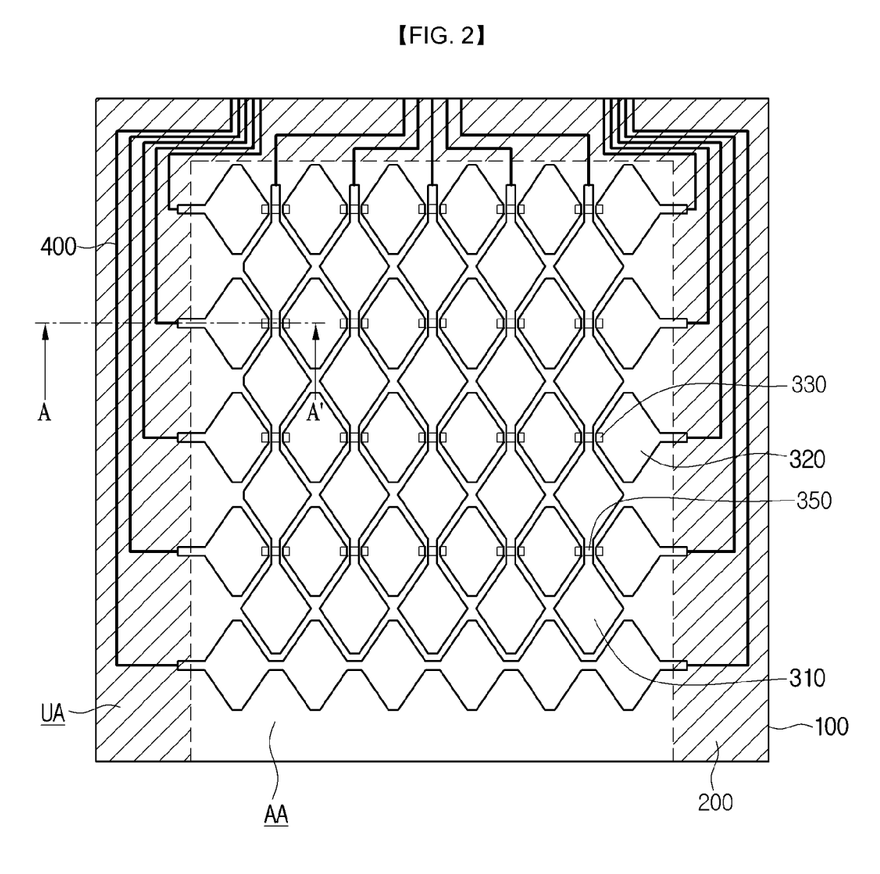
FIG. 2 is a plan view showing the touch panel according to the first embodiment.
Figure 3:
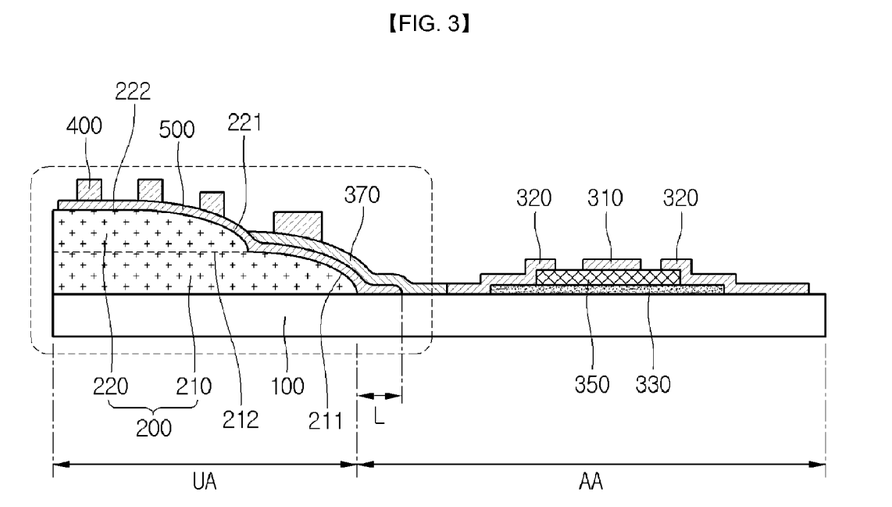
FIG. 3 is a sectional view showing taken along line A-A' of the touch panel according to the first embodiment shown in FIG. 2.

Referring to FIGS. 2 and 3, a bridge electrode 330 may be provided on one surface of the cover substrate 100 in which the sensing electrode 300 is provided. For example, the bridge electrode 330 may be provided in the form of a bar. In detail, bridge electrodes 330 are spaced apart from each other by a predetermined interval while being provided in a bar shape on the active area AA.

An insulating material 350 may be provided on the bridge electrode 330. The insulating material 350 may be partially provided on the bridge electrode 330, and a portion of the bridge electrode 330 may be covered by the insulating material 350. For example, when the bridge electrode 330 is formed in the bar shape, the insulating material 350 may be provided on an area other than one end and an opposite end of the bridge electrode 330, that is, both ends of the bridge electrode 330.

The first sensing electrode 310 may extend over the insulating material 350. For example, the first sensing electrode 310 may extend in the first direction on the insulating material 350 in connection with the insulating material 350. The second sensing electrode 320 may be connected with the bridge electrode 320. The second sensing electrodes 320 spaced apart from each other may be connected with the bridge electrode 330 and may extend in a second direction. Accordingly, the first and second sensing electrodes 310 and 320 are not shorted and not connected due to the bridge electrode and the insulating material, so that the first and second sensing electrodes 310 and 320 may be electrically isolated from each other.

Figure 4:
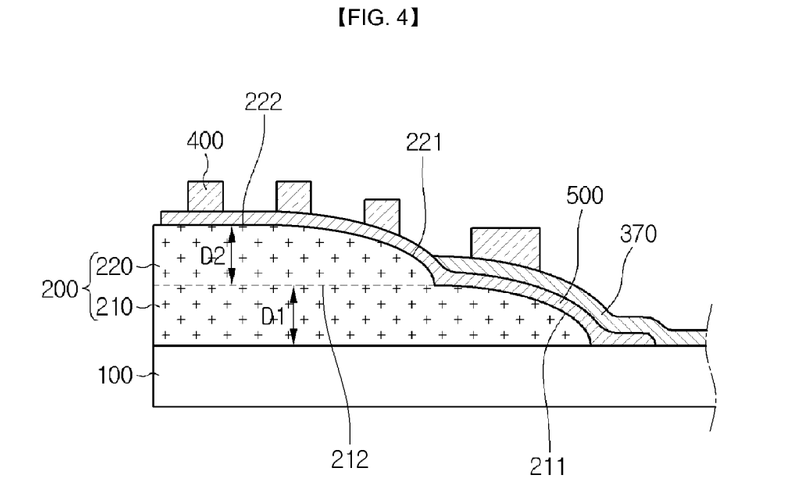
FIG. 4 is an enlarged view showing a printing layer area in the touch panel according to the first embodiment.

Referring to FIGS. 2 to 4, the printing layer 200 may be provided on the unactive area UA of the cover substrate 100. The printing layer 200 may be provided while extending along an edge of the cover substrate 100. The printing layer 200 may be formed by coating black ink or white ink according to a desired outer appearance and by hardening the ink. The printing layer 200 may prevent a wire, which is described later, from being viewed from an outside. In addition, a pattern may be formed on the printing layer 200 so that a desired logo may be realized.

The printing layer 200 may be provided in at least one layer-structure. For example, the printing layer 200 may include first and second printing layers 210 and 220. The first printing layer 210 may be provided on one surface of the cover substrate 100. In addition, the second printing layer 220 may be provided on one surface of the first printing layer 210. The first and second printing layers 210 and 220 may be provided with mutually different widths. For example, the first printing layer 510 may have a width greater than that of the second printing layer 520. Each of the first and second printing layers 510 and 520 may have a thickness in a range of about 6 µm to about 10 µm.

When the thickness of each of the first and second printing layers 510 and 520 is provided less than about 6 µm, a wire electrode on the printing layer may become visible from the outside, so that the visibility of the touch panel may be degraded. When the thickness of each of the first and second printing layers 510 and 520 exceeds about 10 µm, the whole thickness of the touch panel may increase.

In a non-limiting embodiment, third and fourth printing layers may be additionally provided on the second printing layer. Such third and fourth printing layers may have widths different from those of the first and second printing layers. In the following description, description is made while focusing on the case that the printing layer 200 is formed in a two-layer structure, and the structure applied to the embodiment will be identically or similarly applied to another embodiment.

An insulating layer 500 may be provided on the first and second printing layers 210 and 220. The insulating layer 500 may include a resin-based material. For example, the insulating layer 500 may include at least one of resin-based materials such as acrylic resin, silicon resin, urethane resin and epoxy resin.

The insulating layer 500 may include a material that is the same as or similar to the insulating material 350 formed on the active area AA. For example, when the insulating material 350 is provided on the active area AA, the same insulating material may be coated on the unactive area UA, that is, the printing layer 200, so that the insulating material 350 provided on the active area and the insulating layer 500 provided on the printing layer 200 can be simultaneously formed.

The insulating layer 500 may surround the step difference part between the first and second printing layers 210 and 220. For example, the insulating layer 500 may extend from a lateral side 211 of the first printing layer 210 to a top surface 222 of the second printing layer 220. The insulating layer 500 may extend from the lateral side 211 of the first printing layer 210 along the top surface 212 of the first printing layer, the lateral side 221 of the second printing layer 220, and the top surface 222 of the second printing layer.

The insulating layer 500 may be provided with the width of 50 µm or less on the active area AA of the cover substrate 100 when taking into consideration an align tolerance. When the width of the insulating layer 500 exceeds about 50 µm, the unactive area is increased, so that the display area or the touch area may be reduced. As shown in FIG. 3, the insulating layer 500 may be provided on an area L of the active area AA.

The insulating layer 500 may extend from the active area AA of the cover substrate 100 spaced apart from a boundary surface between the unactive area UA and the active area AA of the cover substrate 100 by a distance of about 50 µm along the lateral side and the top surface of the first printing layer 210 and the lateral side and the top surface of the second printing layer 220.

A conductive layer 370 may be additionally provided on the printing layer 200. The conductive layer 370 may be provided on the insulating layer 500 and may extend from the lateral side of the first printing layer 210 toward the top surface of the first printing layer 210. In other words, the insulating layer 500 and the conductive layer 370 are sequentially stacked on the top surface of the first printing layer 210.

The conductive layer 370 may include a material the same as or identical to that constituting the sensing electrode 300 formed on the active area AA. In addition, the conductive layer 370 may be formed through the same process as that of the sensing electrode 300. For example, when the sensing electrode 300 is provided on the active area AA, the same conductive material is provided on the unactive area UA, that is, the printing layer 500, so that the sensing electrode 300 on the active area AA and the conductive layer 370 on the printing layer 300 may be simultaneously formed. In other words, the conductive layer 370 may include a material identical to or similar to that constituting at least one of the first sensing electrode 310, the second sensing electrode 320, and the bridge electrode 330. In addition, the conductive layer 370 may be integrally formed with the sensing electrode 300.

The wire electrode 400 may be provided on the printing layer 500. For example, the wire electrode 400 may be provided on the insulating layer 500 and/or the conductive layer 370 formed on the printing layer 200. The wire electrode 400 may be provided on the conductive layer 370 on the first printing layer 210, and may be provided on the insulating layer 500 on the second printing layer 220. The wire electrode 400 may include a material the same as or similar to that constituting the sensing electrode 300 described above.

The wire electrode 400 formed on the first printing layer 210 may make contact with the conductive layer 370 provided on the first printing layer 210. The first printing layer 210 is provided thereon with a pad part (not shown) to connect the wire electrode 400 with the conductive layer 370 provided on the active area and integrated with the sensing electrode 300. The pad part may be connected with an external circuit such as a printed circuit board 600 having a driving chip mounted therein.

As shown in FIG. 2, the first sensing electrode 310 extends to an upper end of the cover substrate 100 by the wire electrode 400, and the second sensing electrode 320 may extend to an upper end of the cover substrate 100 by the wire electrode 400. In addition, the pad part is provided on the wire electrode 400 and the printed circuit board 600 is connected with the pad part, so that the pad part may be connected with the external circuit.

Although drawings show that both of the first and second sensing electrodes 310 and 320 are extending to the upper ends of the cover substrate 100 by the wire electrode, the embodiment is not limited thereto. The first and second sensing electrodes 310 and 320 may extend in directions opposite to each other. In addition, the first sensing electrode 310 may extend to the upper end of the cover substrate 100, a portion of the second sensing electrode 320 may extend to the left side of the cover substrate 100, and a remaining portion of the second sensing electrode 320 may extend to the right side thereof. In addition, the first and second sensing electrodes 310 and 320 may be withdrawn in various structures allowing the connection with the external circuit.

Accordingly, an electrical signal applied to the sensing electrodes may be transmitted to a driving chip mounted in the printed circuit board 600 through the wire electrode 400.

The insulating layer 500 is formed on the printing layer 200 to reduce the surface roughness of the printing layer 500. For example, a surface of the insulating layer 500 may have the surface roughness of about 0.2 μm to about 0.4 μm. Therefore, when the wire electrode 400 is formed on the printing layer 200, the failure of the wire electrode 400 may be prevented.

When the surface roughness of the insulating layer 500 exceeds 0.4 μm, a high surface roughness may cause the failure of the wiring electrode 400. When the surface roughness is less than 0.2 μm, the thickness of the insulating layer 500 is increased. Accordingly, the overall thickness of the touch panel may be increased and the process efficiency may be degraded.

The printing layer is formed with ink. When the wire electrode is directly formed on the printing layer, the printing layer makes contact with the wire electrode due to the high surface roughness of the printing layer. In this case, the wire electrode is cracked or electrically shorted due to a recess part or a protrusion part of the printing layer. However, according to the touch panel of the embodiment, the insulating layer is provided on the printing layer to reduce the surface roughness of the printing layer making contact with the wire electrode, thereby preventing the wire electrode from being electrically shorted due to the recess part or the protrusion part.

In other words, according to the touch panel of the embodiment, the protrusion part or the recess part formed by the high surface roughness of the printing layer can be reduced, thereby preventing the wire electrode provided on the printing layer from being cracked.

In addition, the wire electrode including the conductive material may have more improved adhesive strength when making contact with the insulating layer rather than the cover substrate. Accordingly, the adhesive strength of the wire electrode can be improved, so that the reliability of the touch panel can be improved.

The insulating layer 500 may have a thickness of about 2 μm to about 3 μm. When the thickness of the insulating layer 500 is less than about 2 μm, the surface roughness may not be reduced to the desired range. The overall thickness of the touch panel may be increased when the thickness of the insulating layer 500 is greater than about 3 μm.

The insulating layer 500 may reduce the inclination angle of a first step difference part D1 formed by the cover substrate 100 and the first printing layer 510. The insulating layer is provided on the lateral side and the top surface of the first printing layer to reduce the inclination angle formed due to the step difference, thereby preventing the crack and the failure of the electrode, which may be caused by the inclination of the step difference part. Accordingly, the reliability of the touch panel can be improved.

In addition, the insulating layer 500 may reduce the inclination angle of a second step difference part D2 between the first printing layer 510 and the second printing layer 520. According to the touch panel of the embodiment, the insulating layer is provided on the lateral side and the top surface of the second printing layer to reduce the inclination angle formed due to the step difference, thereby preventing the crack and the failure of the electrode, which may be caused by the inclination of the step difference part. Accordingly, the reliability of the touch panel can be improved.

Figure 5:
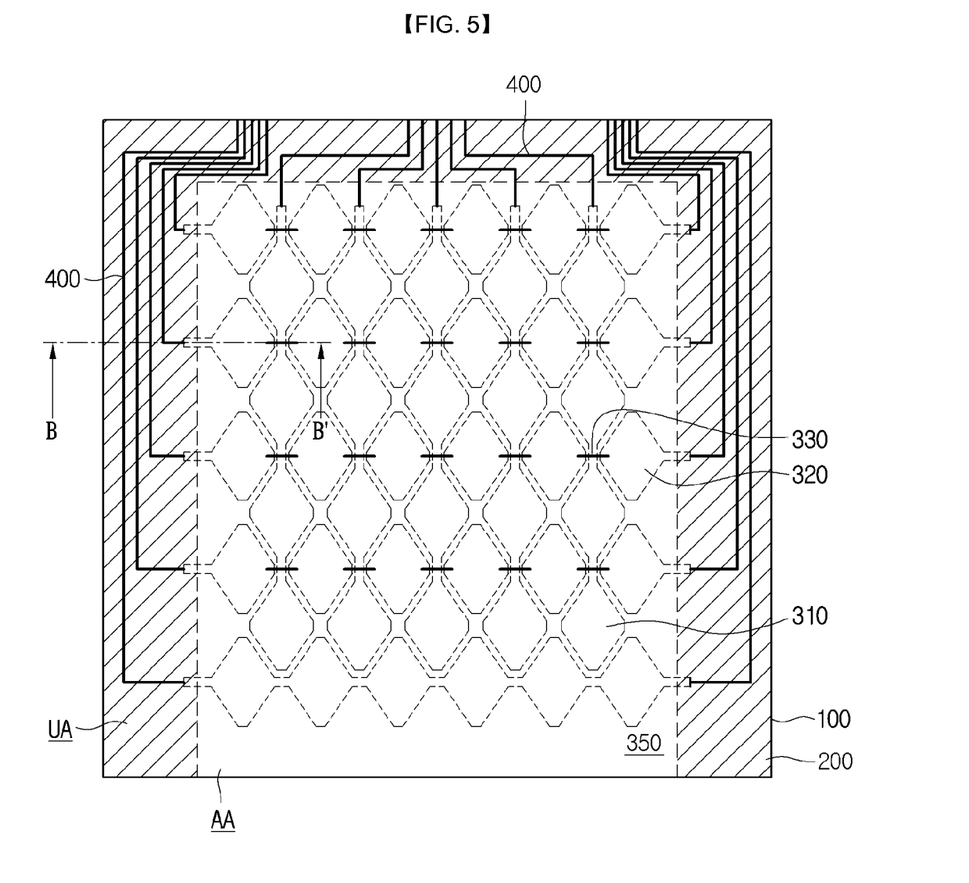
FIG. 5 is a plan view showing another example of the touch panel according to the first embodiment.
Figure 6:
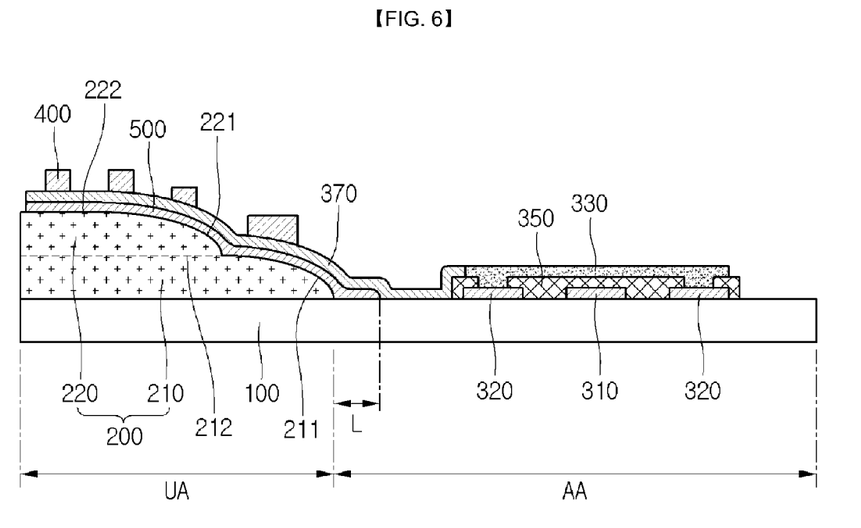
FIG. 6 is a sectional view showing taken along line B-B' of the touch panel according to the first embodiment shown in FIG. 4.

FIGS. 5 and 6 are a plan view and a sectional view showing another example of the touch panel according to the first embodiment. In the following description made with reference to FIGS. 5 and 6, description will be made while focusing on sensing electrodes placed at positions different from those of the sensing electrodes shown in FIGS. 2 and 3, and the details of structures and elements the same as or similar to those shown in FIGS. 2 and 3 will be omitted. In addition, in the following description, the same reference numerals will be assigned to the same elements.

Referring to FIGS. 5 and 6, the cover substrate 100 is provided on one surface thereof with the first and second sensing electrodes 310 and 320 extending in mutually different directions, respectively. In addition, the insulating material 350 may be provided on the entire surface of the active area of the cover substrate 100 in which the sensing electrode 300 is provided.

Holes are formed in the insulating materials 350 in which the second sensing electrodes 320 are spaced apart from each other, and the bridge electrodes 330 may be provided to cover the holes. Accordingly, the first and second sensing electrodes 310 and 320 are provided on the same plane of the cover substrate while being insulated from each other by the insulating material and the bridge electrode.

Hereinafter, a touch panel according to another embodiment will be described with reference to FIGS. 7 to 9. In the following description of the second embodiment, the details of structures and elements the same as or similar to those of the first embodiment described above will be omitted, and the same reference numerals will be assigned to the same elements.

Figure 7:
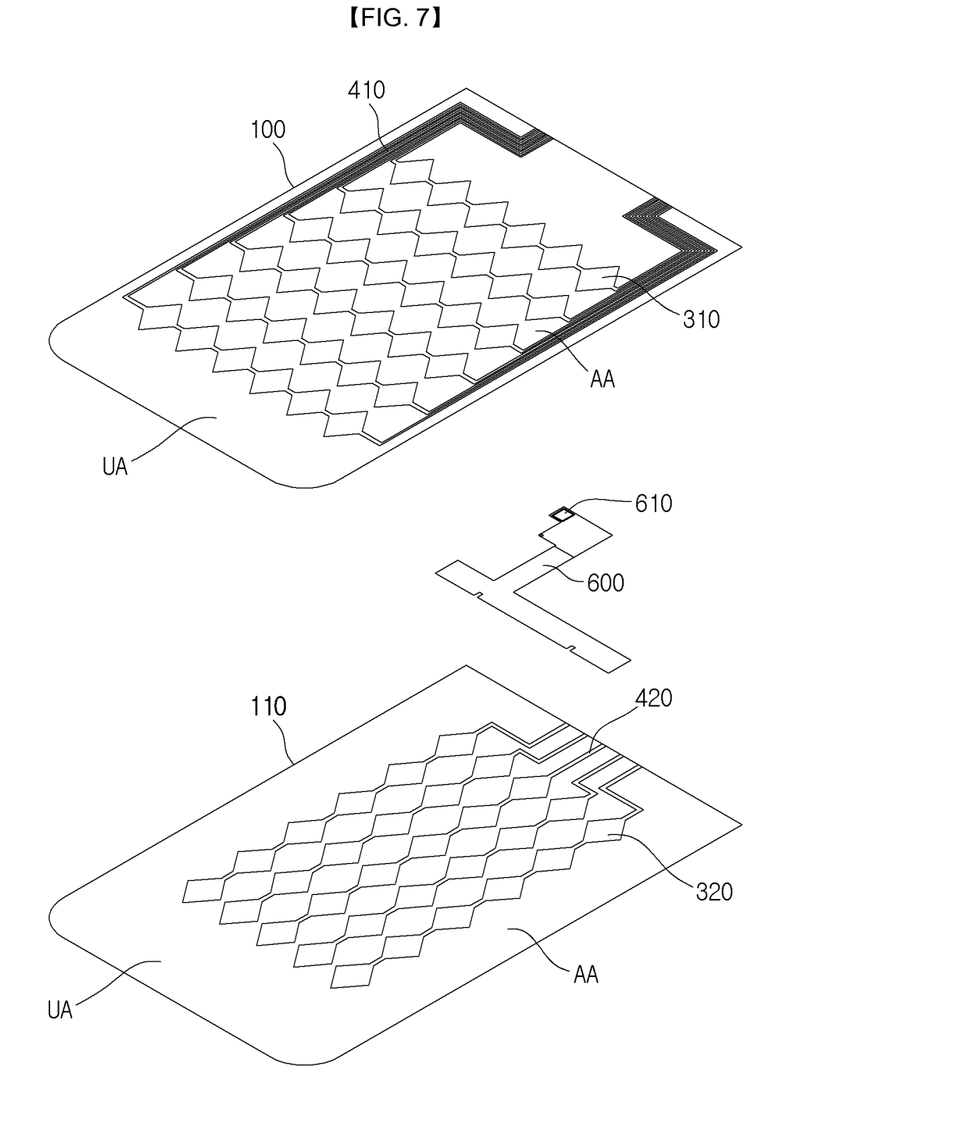
FIG. 7 is a perspective view showing a touch panel according to the second embodiment.
Figure 8:
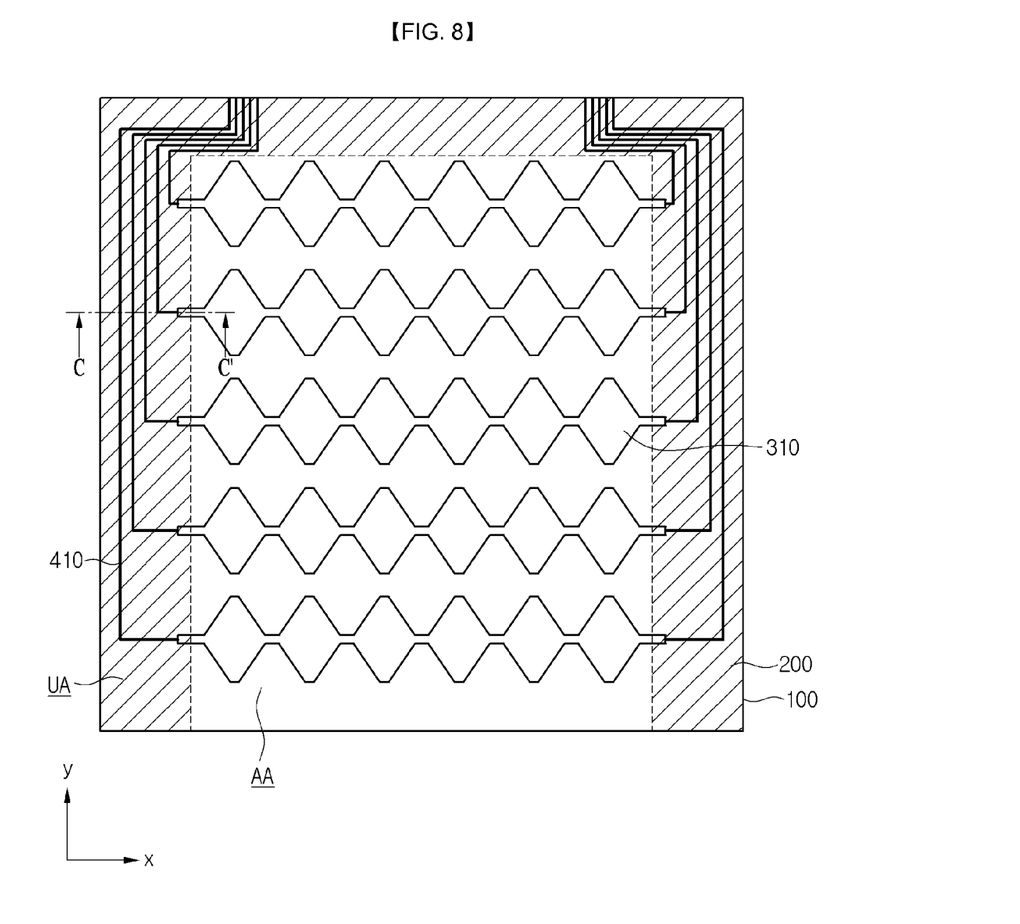
FIG. 8 is a plan view showing the touch panel according to the second embodiment.
Figure 9:
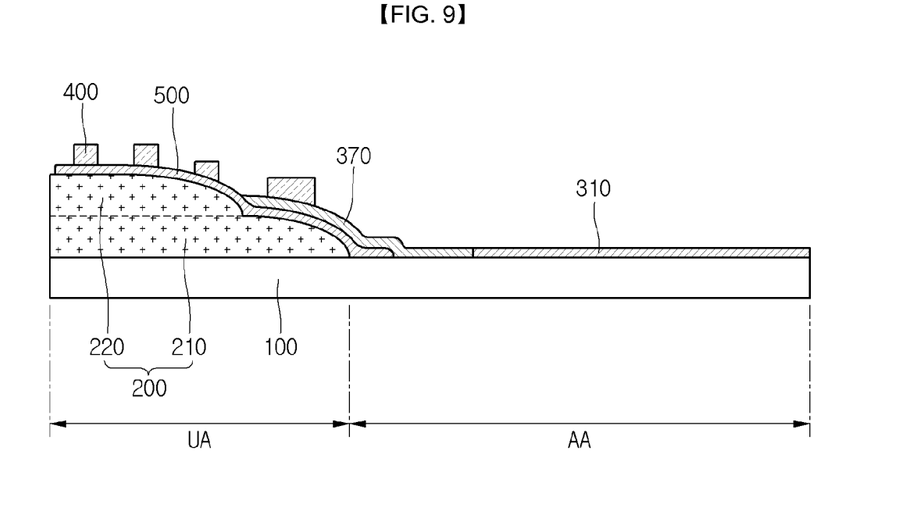
FIG. 9 is a sectional view showing taken along line C-C' of the touch panel according to the second embodiment shown in FIG. 8.

Referring to FIGS. 7 to 9, the touch panel includes the cover substrate 100, a substrate 110, the printing layer 200, the sensing electrode 300, the wire electrode 400 and the insulating layer 500.

The substrate 110 may be provided on the cover substrate 100. The cover substrate 100 may be rigid or flexible. The substrate 110 may include glass or plastic. For example, the substrate 110 may include plastic, such as polyethylene terephthalate (PET) or polyimide (PI), or sapphire.

A portion of the substrate 110 may be curved with a curved surface. In other words, a portion of the substrate 110 may have a flat surface, and another portion of the substrate 110 may be curved with a curved surface. In detail, an end portion of the substrate 110 may be curved with a curved surface or may be curved or bent with a surface having a random curvature.

The cover substrate 100 may be bonded to the substrate 110 through the adhesive layer. For example, the cover substrate 100 and the substrate 110 may be bonded to each other by optical clear adhesive (OCA).

The sensing electrode 300 may be provided on the cover substrate 100 and the substrate 110. For example, the first sensing electrode 310 is provided on the cover substrate 100 and the second sensing electrode 320 may be provided on the substrate 110.

The wire electrode 400 may include the first wire electrode 410 connected with the first sensing electrode 310 and the second wire electrode 420 connected with the second sensing electrode 320. The first wire electrode 420 may be provided on the printing layer 200 on the cover substrate 100, and the second wire electrode 420 may be provided on the substrate 110. Since an insulating layer, a conductive layer, and a printing layer are the same as or similar to those of the first embodiment described above, the details of the insulating layer, the conductive layer, and the printing layer will be omitted in the following description.

Figure 10:
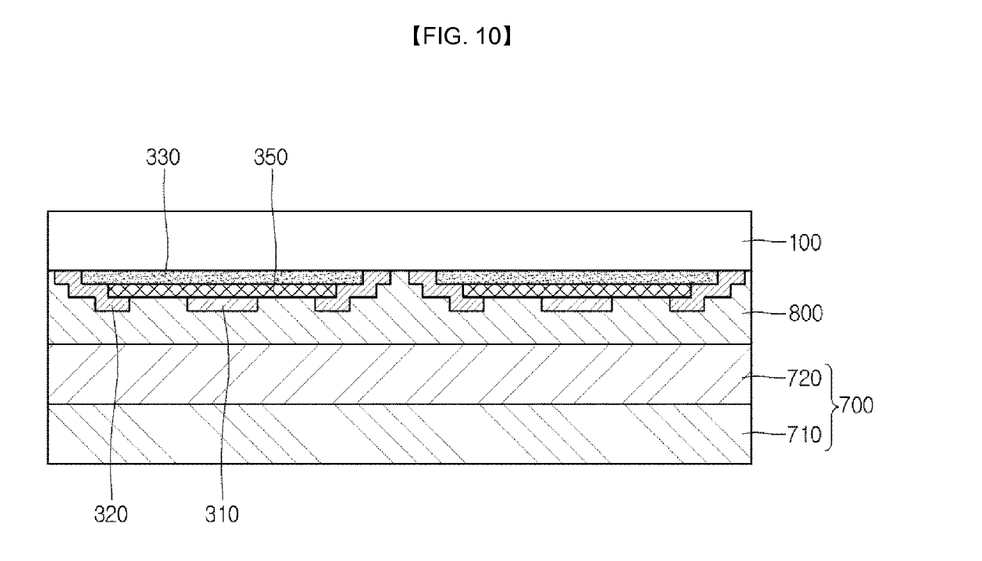
FIGS. 10 to 13 are sectional views showing a touch device in which the touch window according to the embodiment is assembled with a display panel.

FIGS. 10 to 15 are illustrations of the touch panel assembly. The touch device according to the embodiment may include a touch panel provided on a display panel 700. Referring to FIG. 10, the touch device may be formed by assembling the cover substrate 100 with the display panel 700. The cover substrate 100 may be assembled with the display panel 700 through an adhesive layer 800. For example, the cover substrate 100 and the display panel 700 may be combined with each other through the adhesive layer 800 including the OCA.

Figure 11:
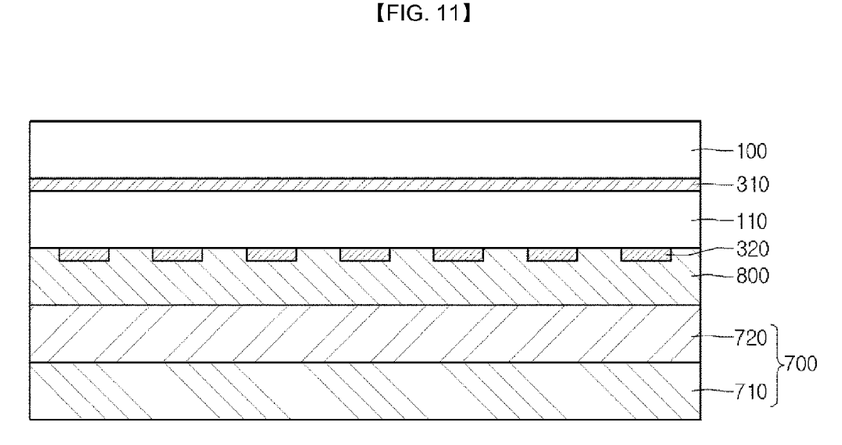

Referring to FIG. 11, when the substrate 110 is further provided on the cover substrate 100, the touch device may be formed by assembling the substrate 110 with the display panel 700. The substrate 110 may be bonded to the display panel 700 through the adhesive layer 800. For example, the substrate 100 may be combined with the display panel 700 through the adhesive layer 800 including the OCA.

The display panel 700 may include first and second substrates 710 and 720. When the display panel 700 is a liquid crystal display panel, the display panel 700 may have a structure in which the first substrate 710 including a thin film transistor (TFT) and a pixel electrode is combined with the second substrate 720 including color filter layers while a liquid crystal layer is interposed between the first and second substrates 710 and 720.

Further, the display panel 700 may be a liquid crystal display panel having a color filter on transistor (COT) structure formed by combining the first substrate 710 formed thereon with the TFT, a color filter, and a black matrix with the second substrate 720 while the liquid crystal layer is interposed between the first and second substrates 710 and 720. In other words, the TFT may be formed on the first substrate 710, a protective layer may be formed on the TFT, and the color filter layer may be formed on the protective layer. In addition, the pixel electrode, which makes contact with the TFT, is formed on the first substrate 710. In this case, to improve an aperture ratio and simplify a mask process, the black matrix may be omitted, and a common electrode may perform a function of the black matrix together with the inherent function thereof.

In addition, when the display panel 700 is a liquid crystal panel, the display device may further include a backlight unit for supplying light onto a rear surface of the display panel 700.

When the display panel 700 is an organic light emitting device, the display panel 700 includes a self light-emitting device which does not require any additional light source. In the display panel 700, the thin film transistor is formed on the first substrate 710, and an organic light-emitting device (OLED) making contact with the thin film transistor is formed. The OLED may include an anode, a cathode and an organic light-emitting layer formed between the anode and the cathode. In addition, the display panel 700 may further include the second substrate 720, which performs the function of an encapsulation substrate for encapsulation, on the OLED.

Figure 12:
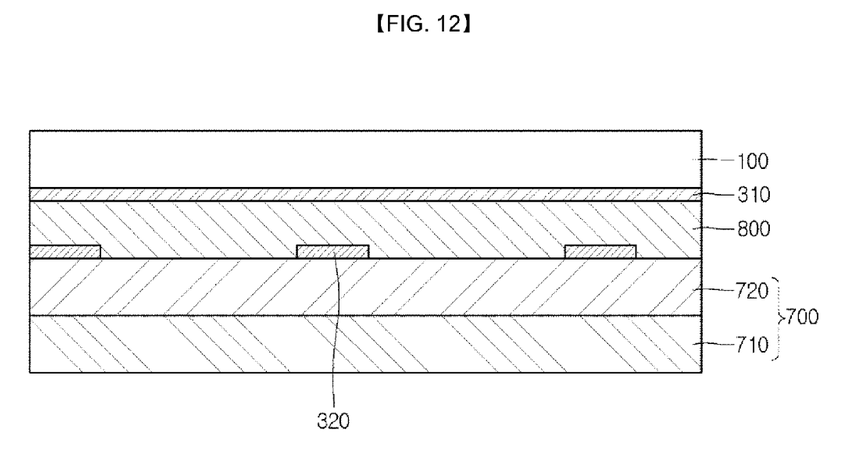

Referring to FIG. 12, the display device according to the embodiment may include a touch window integrated with the display panel 700 where a substrate to support at least one electrode may be omitted. At least one electrode may be disposed on at least one surface of the display panel 700. That is, at least one electrode may be disposed on one surface of at least one of the first and second substrates 710 and 720. At least one sensing electrode may be formed on a top surface of an upper substrate.

Referring to FIG. 12, the first sensing electrode 310 may be provided on one surface of the cover substrate 100. In addition, the first wire connected with the first sensing electrode 310 may be provided on one surface of the cover substrate 100. In addition, the second sensing electrode 320 may be provided on one surface of the display panel 700. In addition, the second wire connected with the second sensing electrode 320 may be provided on one surface of the display panel 700.

The adhesive layer 800 may be interposed between the cover substrate 100 and the display panel 700, so that the cover substrate may be bonded to the display panel 700.

A polarizing plate may be further provided under the cover substrate 100. The polarizing plate may be a linear polarizing plate or an anti-reflection polarizing plate. For example, when the display panel 700 is a liquid crystal display panel, the polarizing plate may be a linear polarizing plate. In addition, when the display panel 700 is an organic electroluminescent display panel, the polarizing plate may be an anti-reflection polarizing plate.

According to the touch device of an embodiment, at least one substrate supporting a sensing electrode may be omitted. Accordingly, a touch device having a thin thickness and a light weight may be formed.

A touch device according to another embodiment will be described with reference to FIG. 13. In the following description, the details of the structures or components similar or the same as those of the above described embodiments will be omitted, and the same reference numbers will be assigned to the same elements.

Figure 13:
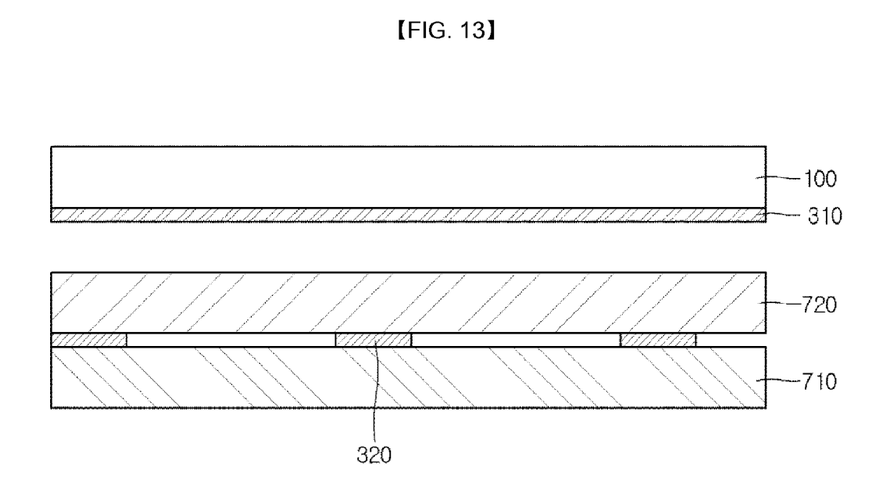
Figure 14:
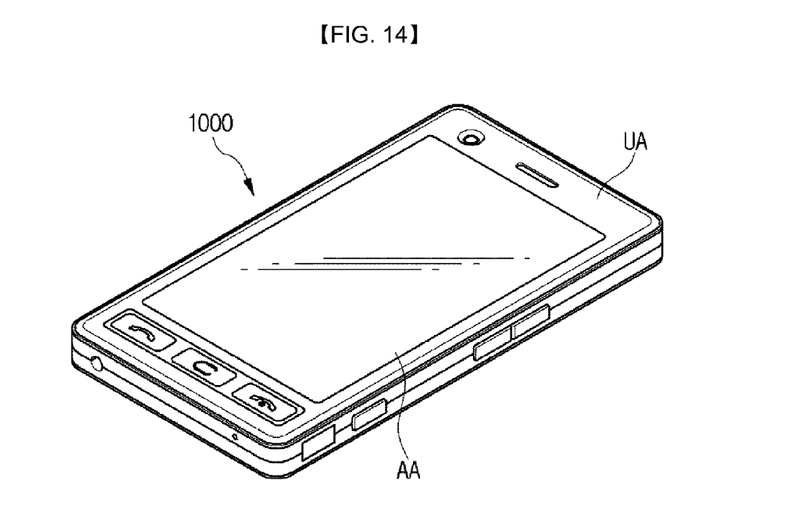
FIGS. 14 to 17 are views showing an example of a touch device assembly employing the touch device according to the embodiment.

Referring to FIG. 13, a touch device according to another embodiment may include a touch panel integrated with a display panel 700. In other words, a substrate for supporting at least one sensing electrode may be omitted.

For example, a sensing electrode, which serves as a sensor disposed in an active area to sense a touch, and a wire to apply an electrical signal to the sensing electrode, may be formed inside the display panel. In detail, at least one sensing electrode or at least one wire may be provided inside the display panel.

The display panel includes first and second substrates 710 and 720. In this case, at least one of the first and second electrodes 310 and 320 is disposed between the first and second substrates 710 and 720. In other words, at least one sensing electrode may be provided on at least one of the first and second substrates 710 and 720.

Referring to FIG. 13, the first sensing electrode 310 may be provided on one surface of the cover substrate 100. In addition, the first wire connected with the first sensing electrode 310 may be provided on one surface of the cover substrate 100. In addition, the second sensing electrode 320 and the second wire may be interposed between the first substrate 710 and the second substrate 720. In other words, the second sensing electrode 320 and the second wire are provided inside the display panel, and the first sensing electrode 310 and the first wire may be provided outside the display panel.

The second electrode 320 and the second wire may be disposed on the top surface of the first substrate 710 or the rear surface of the second substrate 720. In addition, a polarizing plate may be additionally provided under the cover substrate 100.

When the display panel is a liquid crystal display panel and the second sensing electrode is formed on the top surface of the first substrate 710, the sensing electrode may be formed together with a thin film transistor (TFT) and a pixel electrode. In addition, when the second sensing electrode is formed on the rear surface of the second substrate 720, a color filter layer may be formed on the sensing electrode or the sensing electrode may be formed on the color filter layer. When the display panel is an organic light emitting device and the sensing electrode is formed on the top surface of the first substrate 2100, the sensing electrode may be formed with a thin film transistor or an organic light emitting device.

In the touch device according to another embodiment, at least one substrate supporting a touch device to be omitted. Accordingly, the touch device having a thin thickness and a light weight may be formed. In addition, the sensing electrode and the wire are formed together with the device formed in the display panel, so that the fabrication process can be simplified and the cost can be reduced.

FIGS. 14 to 17 are views showing one example of a touch device including the above-described touch panel. A mobile terminal 1000 may include an active area AA and an unactive area UA. The active area AA may sense a touch signal through the touch by a finger, and an instruction icon pattern part and a logo may be formed in the unactive area UA.

Figure 15:
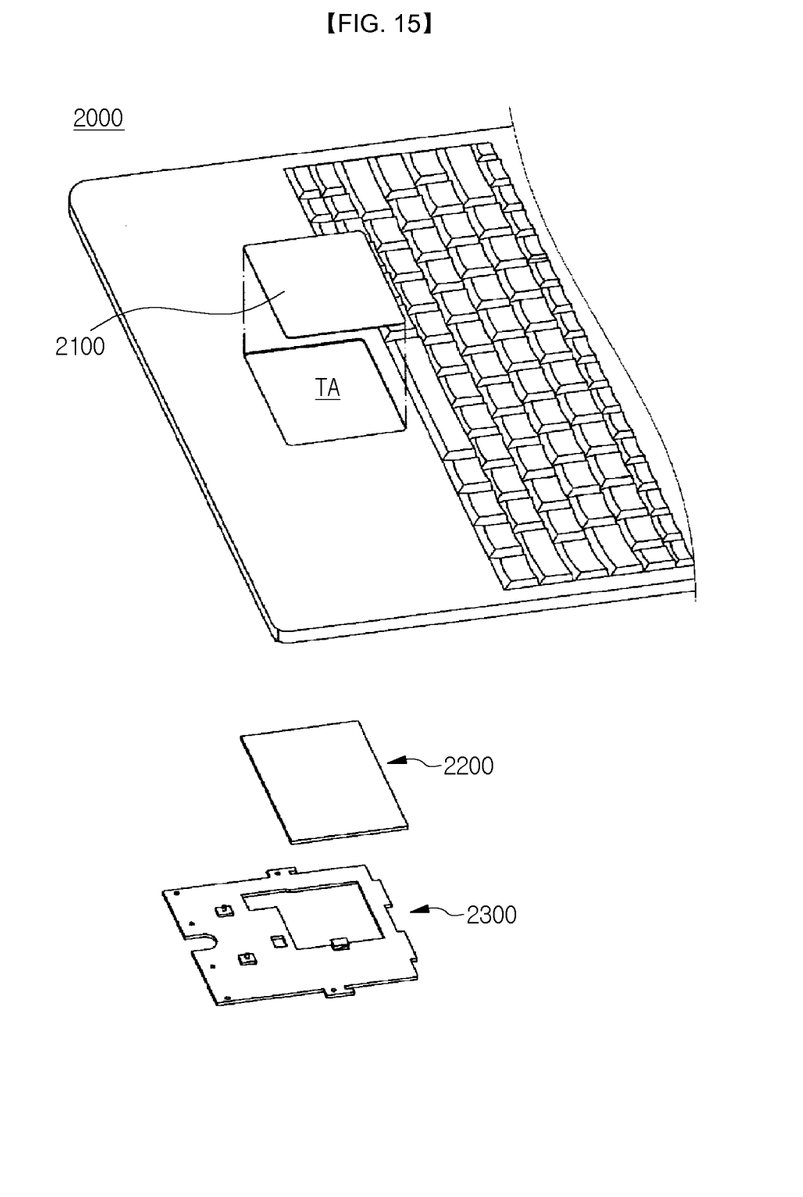
Figure 16:
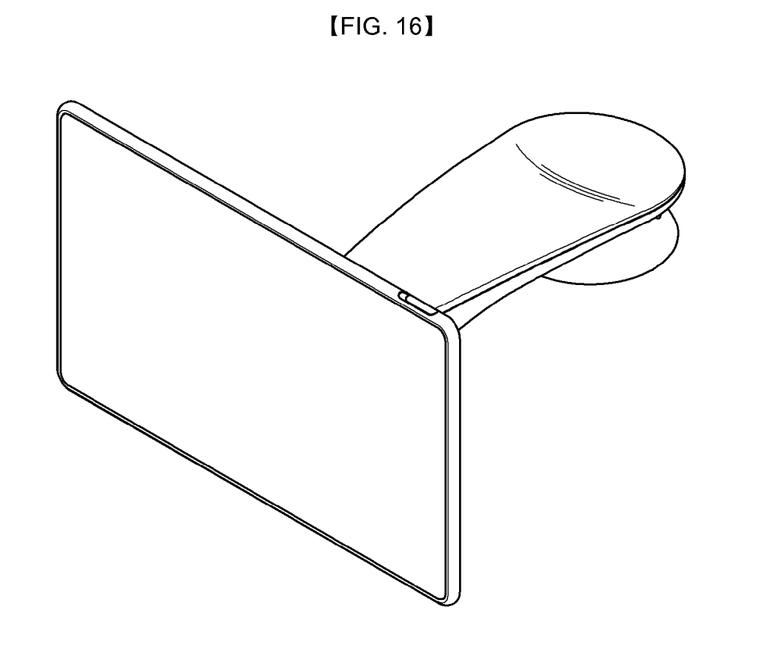
Figure 17:
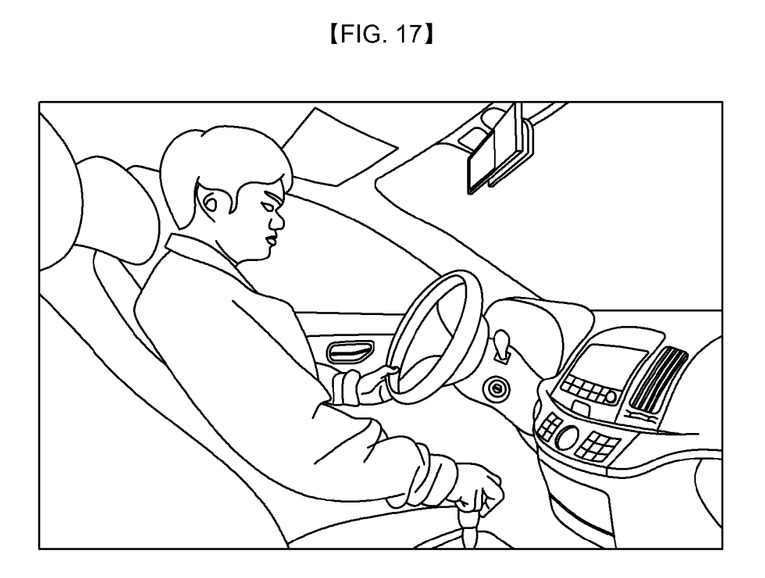

In addition, referring to FIG. 15, a portable laptop computer 2000 is shown as one example of a display device. The portable laptop computer 2000 may include a touch panel 2200, a touch sheet 2100, and a circuit board 2300. The touch sheet 2100 is provided on the top surface of the touch panel 2200. The touch sheet 2100 may protect a touch area TA. In addition, the touch sheet 2100 can improve the touch feeling of a user. The touch panel 2200 is provided a bottom surface thereof with a circuit board 2300 electrically connected with the touch panel 2200. The circuit board 2300 is a printed circuit board which has various parts to configure the portable laptop computer.

The embodiment provides a touch panel having a novel structure representing improved reliability.

According to the embodiment, there is a touch panel including a cover substrate including an active area and an unactive area, a printing layer provided on the unactive area while forming a step difference from the cover substrate, and an insulating layer provided on the printing layer. The insulating layer has average surface roughness in a range of 0.2 μm to 0.4 μm.

As described above, the touch panel according to the embodiment includes the insulating layer provided on the printing layer.

Accordingly, the surface roughness of the printing layer can be reduced. In other words, the surface roughness can be reduced from the entire portion of the printing layer by removing the recess part or the protrusion produced according to the high surface roughness of the printing layer.

Therefore, the electrode formed on the printing layer, that is, an insulating layer can be formed without cracks caused by the recess part or the protrusion, thereby preventing the failure and the disconnection of the electrode.

In addition, the insulating layer can reduce the step difference between the printing layer and the cover substrate or between printing layers.

Therefore, when the sensing electrode or the wire electrode is formed on the printing layer, the sensing electrode or the wire electrode can be prevented from being cracked or disconnected due to the step difference part.

As a result, the touch panel according to the embodiment can improve the reliability of the whole touch panel.

In the preceding description of the embodiments, it will be understood that, when a layer (or film), a region, a pattern, or a structure is referred to as being "on" or "under" another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a cover substrate having an active area and an unactive area;
   a printing layer on the unactive area;
   an insulating layer on a top surface of the active area and an interior lateral surface of the printing layer that faces the active area;
   a sensing electrode on the active area;
   a wire electrode over the unactive area; and
   a conductive layer extending between the sensing electrode and the wire electrode,
   wherein at least a portion of the conducting layer is formed directly on the insulating layer,
   wherein the wire electrode is formed directly on at least one of the insulating layer or the conductive layer, and
   wherein the insulation layer is positioned between the printing layer and the wire electrode and the conductive layer such that the wire electrode and the conductive layer do not contact the top surface or the interior lateral surface of the printing layer.

2. The touch panel of claim 1, wherein the printing layer comprises first and second printing layers having widths different from each other.

3. The touch panel of claim 1, wherein the printing layer comprises:
   a first printing layer provided on the cover substrate to form a first step difference part together with the cover substrate; and
   a second printing layer provided on the first printing layer to form a second step difference part together with the first printing layer.

4. The touch panel of claim 3, wherein the insulating layer extends from a lateral side of the first printing layer to a top surface of the second printing layer.

5. The touch panel of claim 4, wherein the insulating layer directly contacts the lateral side and a top surface of the first printing layer, and a lateral side and the top surface of the second printing layer.

6. The touch panel of claim 4, wherein the sensing electrode comprises:
   first and second sensing electrodes provided on a same surface of the cover substrate, and
   wherein the touch panel further comprises:
   an insulating material on the first and second sensing electrodes; and
   a bridge electrode connected with two second sensing electrodes on the active area.

7. The touch panel of claim 6, wherein the insulating layer comprises a material identical to the insulating material.

8. The touch panel of claim 6,
   wherein the conductive layer comprises a material identical to a material constituting at least one of the first sensing electrode, the second sensing electrode, or the bridge electrode.

9. The touch panel of claim 8, wherein the conductive layer is formed integrally with the first and second sensing electrodes.

10. The touch panel of claim 3, wherein the insulating layer extends along a lateral side and a top surface of the first printing layer and a lateral side and a top surface of the second printing layer from the active area of the cover substrate spaced apart from a boundary surface between the unactive area and the active area of the cover substrate by a distance of 50 µm.

11. The touch panel of claim 4, further comprising:
    a bridge electrode; and
    an insulating material on the bridge electrode,
    wherein the sensing electrode includes:
    a first sensing electrode on the insulating material; and
    second sensing electrodes connected by the bridge electrode.

12. The touch panel of claim 11, wherein the insulating layer comprises a material identical to the insulating material.

13. The touch panel of claim 11,
    wherein the conductive layer comprises a material identical to a material constituting at least one of the first sensing electrode, the second sensing electrode, or the bridge electrode.

14. The touch panel of claim 13, wherein the conductive layer is formed integrally with the first and second sensing electrodes.

15. The touch panel of claim 11, wherein the first and second sensing electrodes are provided on a same surface of the cover substrate.

16. The touch panel of claim 1, wherein the insulating layer has a thickness in a range of 2 µm to 3 µm.

17. The touch panel of claim 1, wherein the sensing electrode comprises first and second sensing electrodes provided on a same surface of the cover substrate;
    wherein the touch panel further comprises a substrate on the cover substrate,
    wherein the first sensing electrode is disposed on the cover substrate, and
    wherein the second sensing electrode is disposed on the substrate.

18. A touch device having a touch panel of claim 1 and further having a display panel on the touch panel.

* * * * *